United States Patent
Samuels

(10) Patent No.: US 8,056,389 B2
(45) Date of Patent: *Nov. 15, 2011

(54) SENSOR SELF-TEST TRANSFER STANDARD

(75) Inventor: Howard Samuels, Newton, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/480,063

(22) Filed: Jun. 8, 2009

(65) Prior Publication Data

US 2009/0235717 A1 Sep. 24, 2009

Related U.S. Application Data

(63) Continuation of application No. 11/461,599, filed on Aug. 1, 2006, now Pat. No. 7,543,473.

(51) Int. Cl.
*G01P 21/00* (2006.01)
(52) U.S. Cl. ........................................... 73/1.37
(58) Field of Classification Search ............ 73/1.37, 73/1.38, 514.32, 514.36, 514.38
See application file for complete search history.

(56) References Cited

U.S. PATENT DOCUMENTS

| | | | |
|---|---|---|---|
| 3,159,037 A | 12/1964 | Blitzer | 73/517 |
| 3,720,915 A | 3/1973 | Hass | 340/52 H |
| 4,805,456 A | 2/1989 | Howe et al. | 73/517 AV |
| 4,950,914 A | 8/1990 | Kurihara et al. | 307/10.1 |
| 5,060,054 A | 10/1991 | White et al. | 73/1 D |
| 5,103,667 A | 4/1992 | Allen et al. | 73/1 D |
| 5,345,824 A | 9/1994 | Sherman et al. | 73/517 B |
| 5,373,722 A * | 12/1994 | Spies et al. | 73/1.39 |
| 6,101,864 A * | 8/2000 | Abrams et al. | 73/1.01 |
| 6,308,554 B1 | 10/2001 | Mattes et al. | 73/1.37 |
| 6,512,364 B1 | 1/2003 | Okada | 324/158.1 |
| 6,840,106 B1 | 1/2005 | McNeil | 73/514.32 |
| 7,086,270 B2 | 8/2006 | Weinberg et al. | 73/1.38 |
| 7,543,473 B2 | 6/2009 | Samuels | 73/1.37 |

OTHER PUBLICATIONS

Analog Devices, Inc., Single-Axis, High-g, *i*MEM® Accelerometers, ADXL78, pp. 1-12, May 2005.

Allen et al., *Micro Electro Mechanical Systems, Proceedings, An Investigation of Micro Structures, Sensors, Actuators, Machines and Robots* (Self-Testable Accelerometer Systems), pp. 113-115, Feb. 1989.

* cited by examiner

*Primary Examiner* — Hezron E Williams
*Assistant Examiner* — Tamiko Bellamy
(74) *Attorney, Agent, or Firm* — Sunstein Kann Murphy & Timbers LLP

(57) ABSTRACT

A system, computer program product and method of obtaining a performance parameter associated with a sensor, such as an accelerometer, is provided. The method includes applying an acceleration to the accelerometer and a first frequency to obtain a sensitivity of the accelerometer at the first frequency. A first self-test is performed on the accelerometer. The first self-test includes stimulating the accelerometer with a first self-test stimulation signal encoded with the first frequency, such that the accelerometer outputs a first signal. A self-test equivalent acceleration is then determined based, at least in part, on the first signal and the accelerometer sensitivity at the first frequency. A second self-test is performed on the accelerometer. The second self-test includes stimulating the accelerometer with a second self-test stimulation signal encoded with the second frequency, such that the accelerometer outputs a second signal. A parameter of the accelerometer is determined at the second frequency based, at least in part, on the second signal and the self-test equivalent acceleration. The parameter may be sensitivity of the accelerometer at the second frequency.

17 Claims, 3 Drawing Sheets

SENSOR SELF-TEST TRANSFER STANDARD

CROSS-REFERENCE TO RELATED APPLICATIONS

This application is a continuation of U.S. patent application Ser. No. 11/461,599, filed Aug. 1, 2006 and entitled "Sensor Self-Test Transfer Standard," which is incorporated herein by reference in its entirety.

TECHNICAL FIELD

The present invention relates to methods of testing sensors and, particularly, a micromachined accelerometer.

BACKGROUND ART

Micromachined accelerometers can be used to sense acceleration for a variety of applications, including sensing the acceleration that occurs as a result of an automobile accident in order to trigger an air bag, or sensing the acceleration resulting from an earthquake in order to automatically shut off a gas line to prevent fires.

Such an accelerometer is often mechanically shaken to obtain various performance parameters. For example, obtaining accelerometer sensitivity at a specific frequency may include shaking the accelerometer at that specific frequency and at a known gee level. However, it is difficult to accurately shake the accelerometer at high frequencies (e.g., 13 kHz). This makes obtaining precise measurements of accelerometer sensitivity at high frequencies problematic.

SUMMARY OF THE INVENTION

In accordance with a first embodiment of the invention, a method of obtaining a performance parameter associated with an accelerometer is provided. The method includes applying an acceleration to the accelerometer at a gee level and a first frequency to obtain a sensitivity of the accelerometer at the first frequency. A first self-test is performed on the accelerometer. The first self-test includes stimulating the accelerometer with a first self-test stimulation signal encoded with the first frequency, such that the accelerometer outputs a first signal. A self-test equivalent acceleration is then determined based, at least in part, on the first signal and the accelerometer sensitivity at the first frequency. A second self-test is performed on the accelerometer. The second self-test includes stimulating the accelerometer with a second self-test stimulation signal encoded with the second frequency, such that the accelerometer outputs a second signal. A parameter of the accelerometer is determined at the second frequency based, at least in part, on the second signal and the self-test equivalent acceleration.

In accordance with another embodiment of the invention, a system for obtaining a performance parameter associated with an accelerometer is provided. The system includes an accelerometer and a controller, the controller for 1) performing a first self-test on the accelerometer, the first self-test including stimulating the accelerometer with a first self-test stimulation signal encoded with a first frequency, such that the accelerometer outputs a first signal, 2) determining a self-test equivalent acceleration based, at least in part, on the first signal and an accelerometer sensitivity at the first frequency (the sensitivity of the accelerometer at the first frequency obtained by applying an acceleration to the accelerometer at substantially the first frequency and a gee level), 3) performing a second self-test on the accelerometer, the second self-test including stimulating the accelerometer with a second self-test stimulation signal encoded with a second frequency, such that the accelerometer outputs a second signal, and 4) determining a parameter of the accelerometer at the second frequency based, at least in part, on the second signal and the self-test equivalent acceleration.

In accordance with still another embodiment of the invention, a computer program product for use on a computer system is provided for obtaining a performance parameter associated with an accelerometer. The computer program product includes a computer usable medium having computer readable program code thereon. The computer readable program code includes program code for 1) performing a first self-test on the accelerometer, the first self-test including stimulating the accelerometer with a first self-test stimulation signal encoded with a first frequency, such that the accelerometer outputs a first signal, 2) determining a self-test equivalent acceleration based, at least in part, on the first signal and an accelerometer sensitivity at the first frequency (the sensitivity of the accelerometer at the first frequency obtained by applying an acceleration to the accelerometer at substantially the first frequency and a gee level), 3) performing a second self-test on the accelerometer, the second self-test including stimulating the accelerometer with a second self-test stimulation signal encoded with a second frequency, such that the accelerometer outputs a second signal, and 4) determining a parameter of the accelerometer at the second frequency based, at least in part, on the second signal and the self-test equivalent acceleration.

In accordance with embodiments related to the above-described embodiments, the parameter may be sensitivity of the accelerometer at the second frequency. The second frequency may be higher than the first frequency. At least one of the first self-test stimulation signal and the second self-test stimulation signal may be created using sigma-delta modulation. A Fourier transform may be performed on at least one of the first signal and the second signal. The accelerometer may include a first fixed electrode, a second fixed electrode, and a movable electrode positioned between first and second fixed electrode, wherein stimulating the accelerometer with either the first self-test stimulation signal and the second self-test stimulation signal causes the movable electrode to move between the first and second electrode.

In accordance with another embodiment of the invention, a method, system, and computer program product for performing self-test on an accelerometer is provided. The accelerometer is stimulated with a first self-test stimulation signal such that the accelerometer outputs a first signal having an AC component. A self-test equivalent acceleration is determined based, at least in part, on the first signal.

In accordance with related embodiments of the invention, creating the first self-test stimulation signal may include using sigma-delta modulation. A Fourier transform may be performed on the first signal, wherein the self-test equivalent acceleration is determined based, at least in part, on an amplitude of the Fourier transform. The accelerometer may includes a first fixed electrode, a second fixed electrode, and a movable electrode positioned between first and second fixed electrode, wherein stimulating the accelerometer with the first self-test stimulation signal causes the movable electrode to move between the first and second electrode.

In further related embodiments of the invention, an acceleration may be applied to the accelerometer at a first frequency and a gee level to obtain a sensitivity of the accelerometer at the first frequency, wherein determining the self-test equivalent acceleration is based, at least in part, on the sensitivity of the accelerometer at the first frequency. The first frequency may be encoded into the first self-test stimulation signal. The accelerometer may be stimulated with a second self-test stimulation signal encoded with a second frequency such that the accelerometer outputs a second signal, the second frequency different from the first frequency. The sensitivity of the accelerometer may be determined at the second frequency based, at least in part, on the self-test equivalent acceleration and the second signal. The second frequency may be higher than the first frequency. The second self-test signal may be created using sigma-delta modulation.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

In illustrative embodiments, an accurate measurement of an accelerometer parameter at high frequencies is achieved. To those ends, a self-test equivalent acceleration is obtained, in part, by 1) shaking the accelerometer at a low frequency to determine accelerometer sensitivity, and 2) and conducting accelerometer self-test at the low frequency. The self-test equivalent acceleration is then used as a transfer standard between low frequency and high frequency self-test. Details of illustrative embodiments are discussed below.

Figure 1:
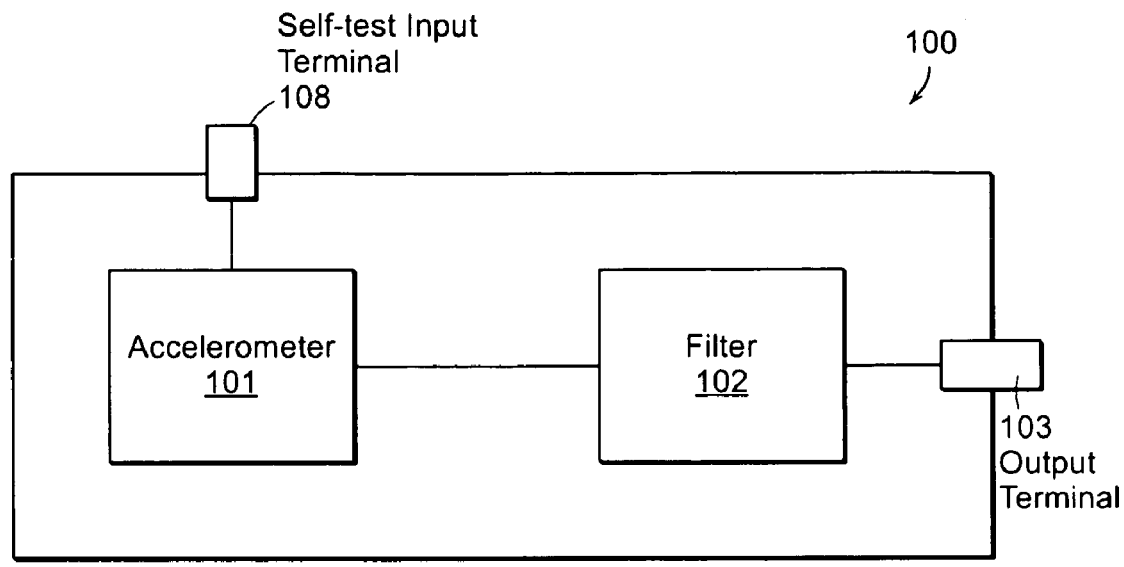
FIG. 1 shows an exemplary sensor system 100 (prior art)

FIG. 1 shows an exemplary sensor system 100 that includes an accelerometer 101 having at least one output terminal 103. In normal operation, the output terminal 103 provides a signal indicative of sensor acceleration. A signal processor 102 may shape the signal prior to placement on the output terminal 103. The signal processor 102 may include, without limitation, various filters and/or rectifiers. For example, the accelerometer 101 may include one or more high or low pass filters 102, and have both a high frequency output and a low frequency output.

Figure 2:
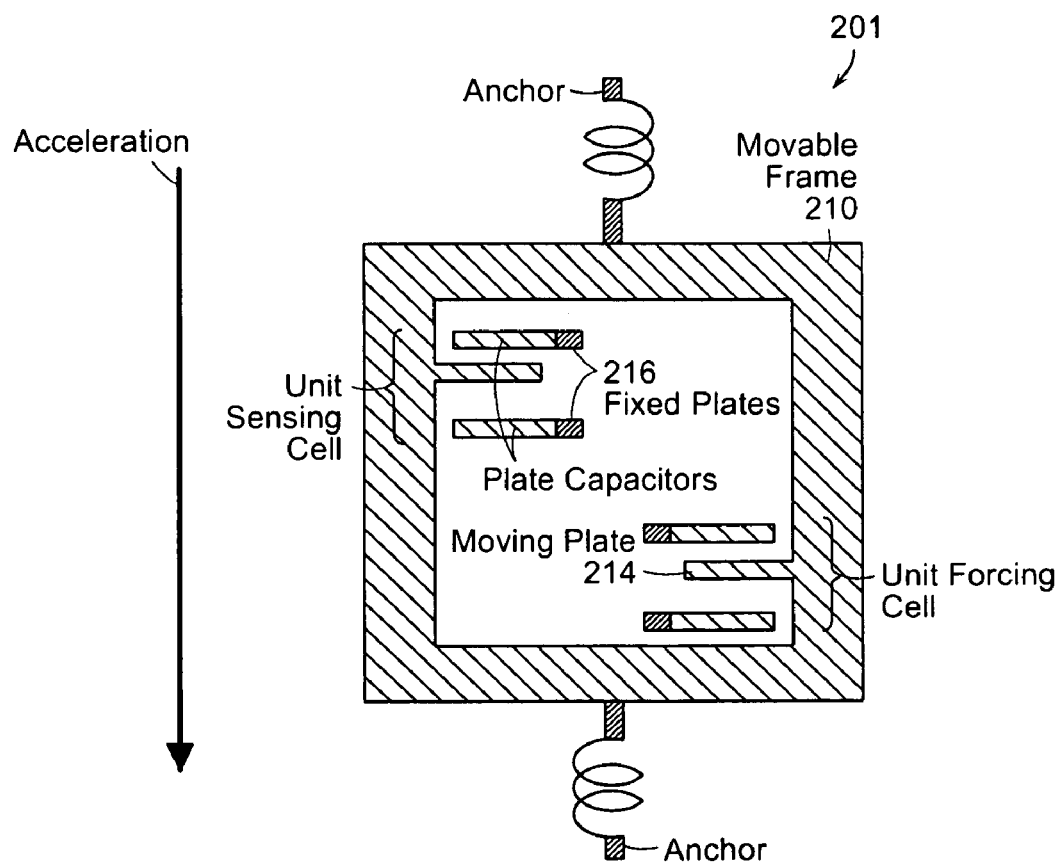
FIG. 2 shows an exemplary micromachined accelerometer 201 (prior art)

An exemplary micromachined accelerometer 201 is shown in FIG. 2. The accelerometer 201 includes a polysilicon frame 210 suspended over a substrate by supporting tethers 212. The frame 210, which is essentially parallel to the substrate, has a beam elongated along an axis, and a number of fingers 214 that extend away from the beam in a direction perpendicular to the axis of the beam. The beam and fingers 214 are movable laterally relative to the substrate along the axis. Each of these movable fingers 214 is positioned between two polysilicon fingers 216 that are in the plane of the frame 210 and are fixed relative to the substrate. Each movable finger 214 and the fixed fingers 216 on either side of the movable finger form a differential capacitor cell. The cells additively form a differential capacitor. Instead of polysilicon, the accelerometer may be made of other materials known in the art, such as monocrystalline silicon.

Different approaches can be used to sense acceleration with such a differential capacitor. One approach is to use force feedback, as described in U.S. Pat. No. 5,345,824, which is incorporated by reference herein in its entirety. The movable fingers (i.e., movable with the mass) are each centered between two fixed fingers. All the fixed fingers on one side of the movable fingers are electrically coupled together, and all the fixed fingers on the other side of the movable fingers are also electrically coupled together. The two sets of fixed fingers are at different DC potentials and are driven with AC carrier signals that are 180 degrees out of phase with respect to each other. In response to an external force/acceleration along a sensitive axis, the mass with movable fingers moves toward one or the other set of fixed fingers. The signal on the beam is amplified, demodulated, and provided to an output terminal. A feedback network connects the output terminal and the beam. The feedback causes the movable fingers to be re-centered between the two sets of fixed fingers. The signal at the output terminal is a measure of the force required to re-center the beam, and is therefore proportional to acceleration.

To verify proper operation of the sensor system 100, a self-test input terminal 108 is provided. Activating self-test causes a step function force to be applied to the accelerometer 201. More particularly, activating self-test via the self-test input terminal 108 causes the voltage on the fixed fingers 216 on one side of the moving frame 210 in forcing cells 219 to change. This creates an attractive electrostatic force, causing the frame 210 to move toward those fixed fingers 216. This sensor displacement changes the signal seen at the sensor output terminal 103.

Arbitrary waveforms can be applied to the sensor by modulating the self-test input. For example, past testing methodologies have included applying a sigma-delta modulated signal to the self-test input to determine sensor resonant frequency. Note however, the enumerated value of the output signal amplitude was not considered in these methodologies.

Figure 3:
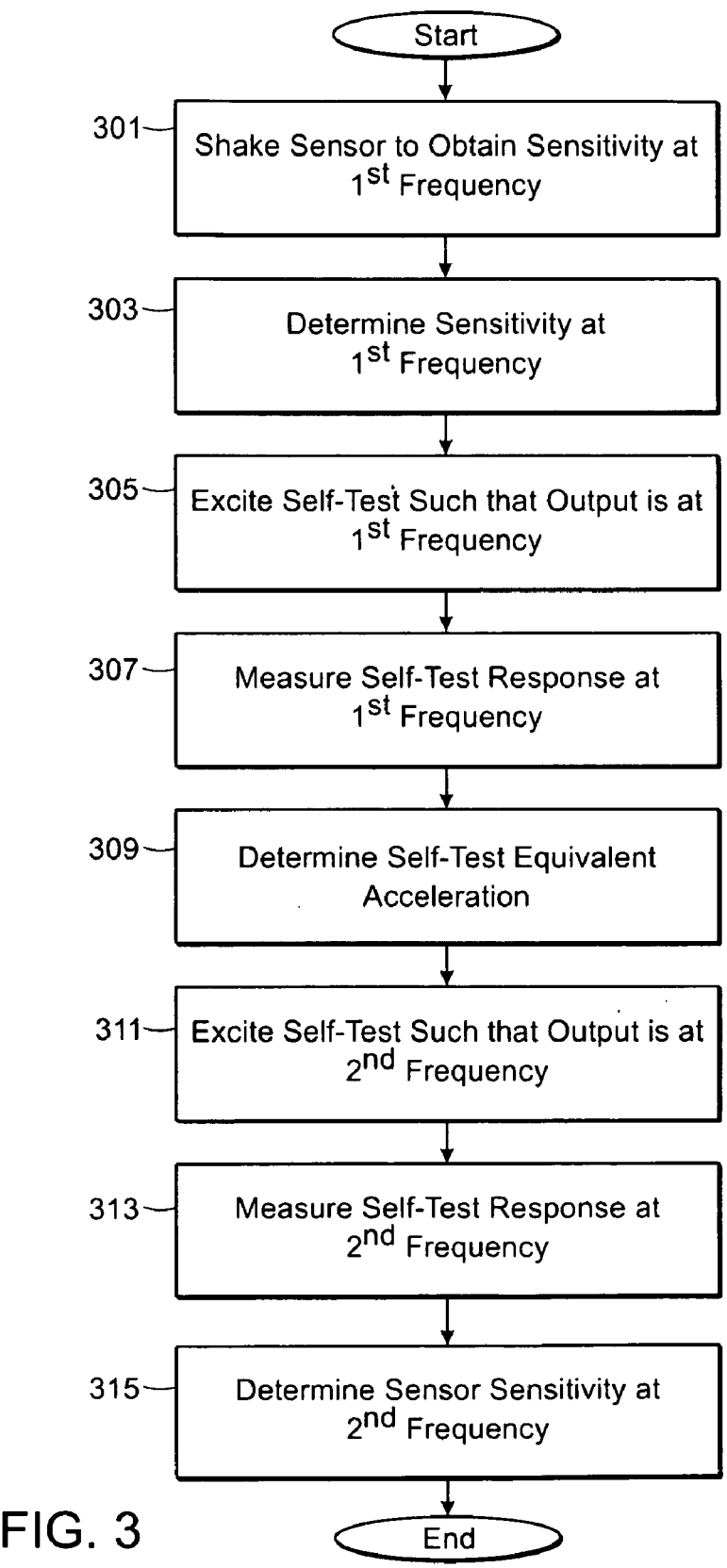
FIG. 3 is a flow diagram illustrating a method of obtaining a sensor parameter at a desired frequency, in accordance with an embodiment of the invention.

FIG. 3 is a flow diagram illustrating a method of obtaining a sensor parameter at a desired frequency, in accordance with an embodiment of the invention. In particular, the method may be advantageously used to measure accelerometer sensitivity at a high frequency. Easier and more accurate measurements are obtained since the method does not require shaking the accelerometer at the high frequency.

The method begins with step 301, which includes mechanically shaking the sensor at a first frequency. A conventional test apparatus may be used to shake the sensor. For example, the test apparatus may utilize electrodynamics, or include a hammer blow or ball drop. A known force (e.g., gee level) is applied to the sensor. In various embodiments, the first frequency is a low frequency (e.g., 100 Hz) allowing for increased accuracy and ease of testing.

The method continues to step 303, in which accelerometer sensitivity at the first frequency is determined. Referring to FIG. 1, the signal at the output terminal 103 (indicative of acceleration) is measured while shaking the sensor at the first frequency. To obtain the sensitivity, this measurement is divided by the applied force. In various embodiments, the response of the accelerometer may be accurately measured by digitizing the output signal and performing a Fourier transform on the digitized signal. Energy at frequencies other than the frequency of interest can be disregarded.

After determining the sensitivity of the accelerometer at the first frequency, self-test is excited in step 305, such that the accelerometer output signal at the output terminal 103 is at the first frequency. In various embodiments, the accelerometer output signal may be an AC signal having the first frequency. Excitation of the accelerometer is accomplished by applying a self-test stimulation signal to the self-test input terminal 108, as described above. In various embodiments, the self-test stimulation signal may be a sigma-delta modulated signal encoded with the first frequency.

The self-test response at the first frequency is then measured, in step 307. Accurate measurements of the self-test response may, without limitation, be obtained by digitizing the output signal at the output terminal 103 of the accelerometer, performing a Fourier transform on the digitized output, and disregarding non-relevant frequency bins, as described above.

The method continues to step 309, in which the self-test equivalent acceleration is determined. The self-test acceleration may be determined based, at least in part, on the sensitivity of the accelerometer at the first frequency (determined in step 303), and the self-test response of the accelerometer at the first frequency (measured in step 307). More particularly, the response of the accelerometer at the first frequency (e.g., volts) may be divided by the sensitivity of the accelerometer at the first frequency (e.g., volts/gee level) to obtain the self-test equivalent acceleration. Note that the accelerometer typically does not have the same sensitivity at the first frequency and another different frequency. Thus, to ensure accuracy in determining the self-test equivalent acceleration, both the sensitivity and the self-test response are determined at substantially the same frequency (i.e., the first frequency).

In illustrative embodiments of the invention, the self-test equivalent acceleration may now be used as a transfer standard between self-test at the first frequency (e.g., a low frequency) and self-test at a second frequency (e.g., a high frequency). The self-test equivalent acceleration is the same at either frequency. This advantageously allows determination of sensor parameters at the second frequency via self-test without having to mechanically shake the sensor at the second frequency.

In step 311, self-test is excited such that the accelerometer output signal at the output terminal 103 is at the second frequency. For example, the accelerometer output signal may be an AC signal having the second frequency. As in step 307, excitation of the accelerometer is accomplished by applying a self-test stimulation signal to the self-test input terminal 108. The self-test stimulation signal may be, for example, a sigma-delta modulated signal encoded with the second frequency.

The self-test response at the first frequency is then measured, in step 311. As described above, to accurately measure the self-test response, the output signal at the output terminal 103 of the accelerometer may, without limitation, be digitized, a Fourier transform performed on the digitized output, and the non-relevant frequency bins disregarded, as described above.

The method then continues to 315, in which a parameter of the sensor at the second frequency is determined. As shown in FIG. 3, the parameter may be, without limitation, sensitivity of the sensor at the second frequency. More particularly, the sensitivity may be determined by dividing the self-test response at the second frequency by the self-test equivalent acceleration determined in step 309. Note that other sensor parameters may be obtained using this methodology, and that the parameter determined is not restricted to sensor sensitivity.

It is to be understood that the order of steps in the methodology illustrated in FIG. 3 is not important and can vary. For example, exciting self-test at the first frequency in step 305, and measuring self-test response in step 307, may occur before mechanically shaking the sensor in step 301 to obtain sensitivity, step 303.

As described above, the accelerometer may have more than one output terminal, such as a low frequency output terminal and a high frequency output terminal. In such embodiments, the choice of output terminal used to measure the response of the accelerometer may be based on, without limitation, the expected frequency of the output signal.

Figure 4:
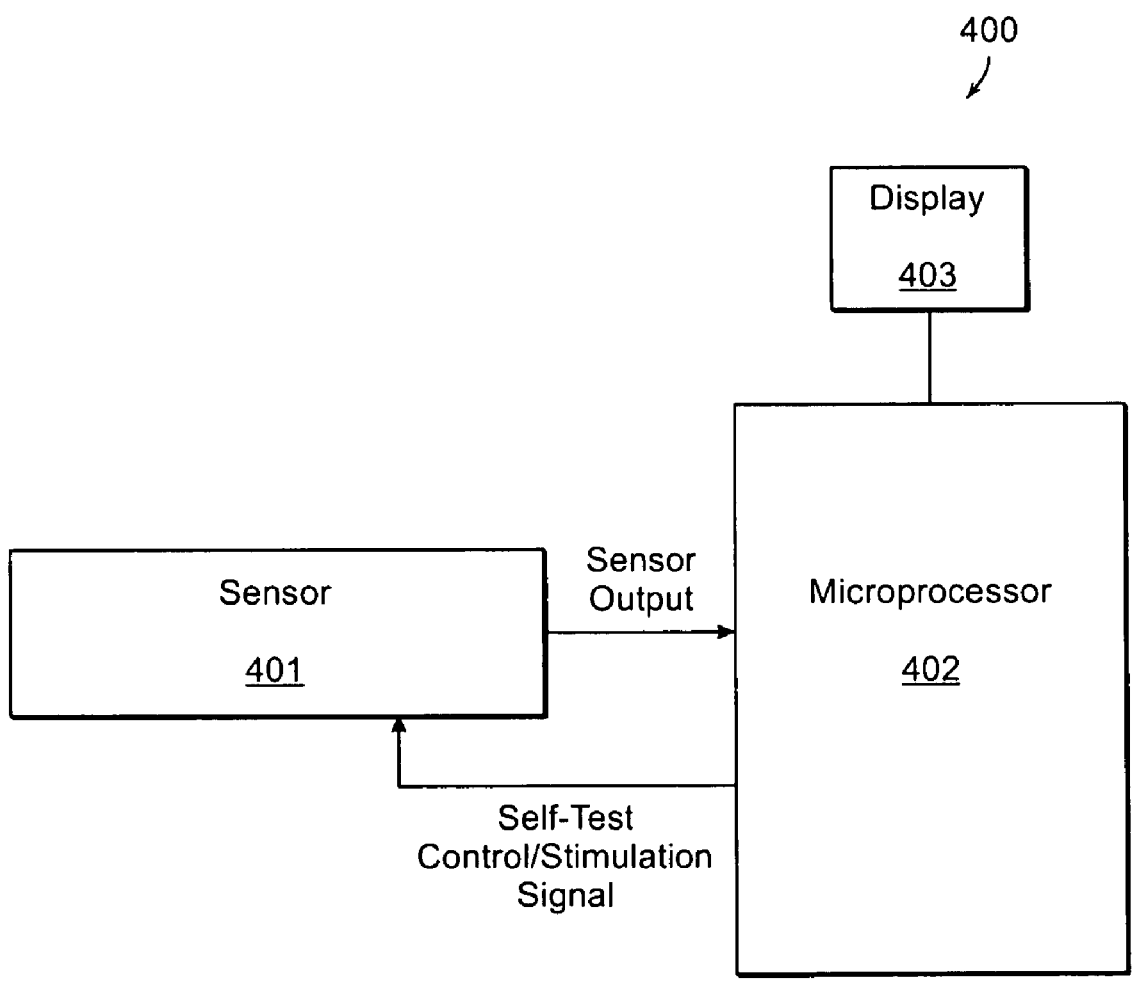
FIG. 4 illustrates a sensor test assembly, in accordance with one embodiment of the invention.

FIG. 4 shows a system 400 that may be used to test the sensor 401, in accordance with an embodiment of the invention. A controller 402, such as, without limitation, a microprocessor, performs self-test control and monitoring of the sensor 401, and also may include controls/monitoring for mechanically shaking the sensor 401. The processor 402 may generate output signals to provide self-test stimulation signals for the sensor 401 and/or monitor sensor output. Output (s) from the sensor may be filtered by the processor 404 or otherwise modified. The processor may be used to perform various calculations, such as calculating self-test equivalent acceleration and/or accelerometer sensitivity. Results from accelerometer self-test and/or mechanically shaking of the accelerometer may be presented on a display 403.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

Embodiments of the invention are not limited to any particular type of sensor such as the above described capacitive sensor. Further, the techniques described above may be applied to a wide range of sensor assemblies for sensing parameters beyond acceleration, rotation and the like. Other variations and modifications of the embodiments described above are intended to be within the scope of the present invention as defined in the appended claims.

What is claimed is:

1. A method of determining a parameter associated with an accelerometer, the method comprising:
    applying an acceleration to the accelerometer to obtain a sensitivity of the accelerometer;
    stimulating the accelerometer via self-test at a first frequency and a second frequency, the first frequency different from the second frequency;
    determining a self-test equivalent acceleration based, at least in part, on the sensitivity of the accelerometer, and an output of the accelerometer resulting from self-test stimulation at the first frequency; and
    determining a parameter of the accelerometer based, at least in part, on the self-test equivalent acceleration, output from the accelerometer resulting from the stimulation, and the sensitivity.

2. The method according to claim 1, wherein stimulating the accelerometer includes stimulating the accelerometer with at least one of a first self-test stimulation signal and a second self-test stimulation signal.

3. The method according to claim 1, where stimulating the accelerometer includes using sigma-delta modulation.

4. The method according to claim 1, wherein the accelerometer includes a first fixed electrode, a second fixed electrode, and a movable electrode positioned between first and second fixed electrode, and wherein stimulating the accelerometer causes the movable electrode to move between the first and second electrode.

5. The method according to claim 1, wherein determining the parameter includes:
    determining a sensitivity of the accelerometer at the second frequency based, at least in part, on the self-test equivalent acceleration and an output of the accelerometer resulting from self-test stimulation at the second frequency.

6. The method according to claim 5, wherein the second frequency is higher than the first frequency.

7. A computer program product for determining a parameter associated with an accelerometer, the computer program product comprising a computer usable medium having computer readable program code thereon, the computer readable program code including program code for:
    applying an acceleration to the accelerometer to obtain a sensitivity of the accelerometer;
    stimulating the accelerometer via self-test at a first frequency and a second frequency, the first frequency different from the second frequency;
    determining a self-test equivalent acceleration based, at least in part, on the sensitivity of the accelerometer and an output of the accelerometer resulting from self-test stimulation at the first frequency; and
    determining a parameter of the accelerometer based, at least in part, on the self-test equivalent acceleration, output from the accelerometer resulting from the stimulation, and the sensitivity.

8. The computer program product according to claim 7, wherein the program code for stimulating the accelerometer includes program code for stimulating the accelerometer with at least one of a first self-test stimulation signal and a second self-test stimulation signal.

9. The computer program product according to claim 7, where stimulating the accelerometer includes using sigma-delta modulation.

10. The computer program product method according to claim 7, wherein the accelerometer includes a first fixed electrode, a second fixed electrode, and a movable electrode positioned between first and second fixed electrode, and wherein the program code for stimulating the accelerometer causes the movable electrode to move between the first and second electrode.

11. The computer program product code according to claim 7, wherein determining the parameter includes determining sensitivity of the accelerometer at the second frequency based, at least in part, on the self-test equivalent acceleration and an output of the accelerometer resulting from self-test stimulation at the second frequency.

12. The computer program product according to claim 11, wherein the second frequency is higher than the first frequency.

13. A system for determining a parameter associated with an accelerometer, the system comprising:
    an accelerometer; and
    a controller for:
        applying an acceleration to the accelerometer to obtain a sensitivity of the accelerometer;
        stimulating the accelerometer via self-test at a first frequency and a second frequency, the first frequency different from the second frequency;
        determining a self-test equivalent acceleration based, at least in part, on the sensitivity of the accelerometer and an output of the accelerometer resulting from self-test stimulation at the first frequency; and
        determining a parameter of the accelerometer based, at least in part, on the self-test equivalent acceleration, output from the accelerometer resulting from the stimulation, and the sensitivity.

14. The system according to claim 13, wherein the controller stimulates the accelerometer with at least one of a first self-test stimulation signal and a second self-test stimulation signal.

15. The system according to claim 13, where the controller stimulates the accelerometer using sigma-delta modulation.

16. The system according to claim 13, wherein accelerometer includes a first fixed electrode, a second fixed electrode, and a movable electrode positioned between first and second fixed electrode, and wherein the controller stimulates the accelerometer so as to cause the movable electrode to move between the first and second electrode.

17. The system according to claim 13, wherein the controller determines sensitivity of the accelerometer at the second frequency based, at least in part, on the self-test equivalent acceleration and an output of the accelerometer resulting from self-test stimulation at the second frequency.

\* \* \* \* \*